June 30, 1959 J. R. HUNTLEY ET AL 2,892,256

MEASURING GAUGE STRUCTURE

Filed Sept. 17, 1957 2 Sheets-Sheet 1

INVENTORS
JAMES R. HUNTLEY &
WILLIAM F. SOUTHARD
BY
Parrott & Richards
ATTORNEYS INVENTORS
JAMES R. HUNTLEY &
WILLIAM E. SOUTHARD
BY
Parrott & Richards
ATTORNEYS United States Patent Office 2,892,256

Patented June 30, 1959

2,892,256

MEASURING GAUGE STRUCTURE

James R. Huntley and William F. Southard, Monroe, N.C., assignors to Tool Service Engineering Company, a corporation of North Carolina Application September 17, 1957, Serial No. 684,567

7 Claims. (Cl. 33—125)

This invention relates generally to gauging means, and more particularly to an improved measuring gauge structure incorporating an arrangement by which accurate settings to a given measurement can be made with unique facility.

The measuring gauge structure of the present invention may be used to particular advantage for coordinate gauging purposes and is described further below in relation to an embodiment designed principally for such purposes, although the arrangement provided is basically adaptable for many other gauging purposes as well.

Briefly described, the measuring gauge structure provided by the present invention comprises a series of unit length gauge blocks arranged for intersection by a cam slide member on which an inclined cam surface is formed that rises in an extent equal to the unit gauge block length over an extent lengthwise of the cam slide member that is a substantial multiple of this unit length; e.g., ten times the unit length. By this arrangement the gauge block series can be employed not only in the usual manner for cumulative measurement in unit length increments, but also in combination with the cam slide member to measure any fractional part of a unit length increment and to magnify the fractional increment setting through the cam slide member so that a high degree of accuracy is easily obtained.

These and other features of the present invention are described in further detail below in connection with the accompanying drawings, in which.

Figures 1, 2, 3:
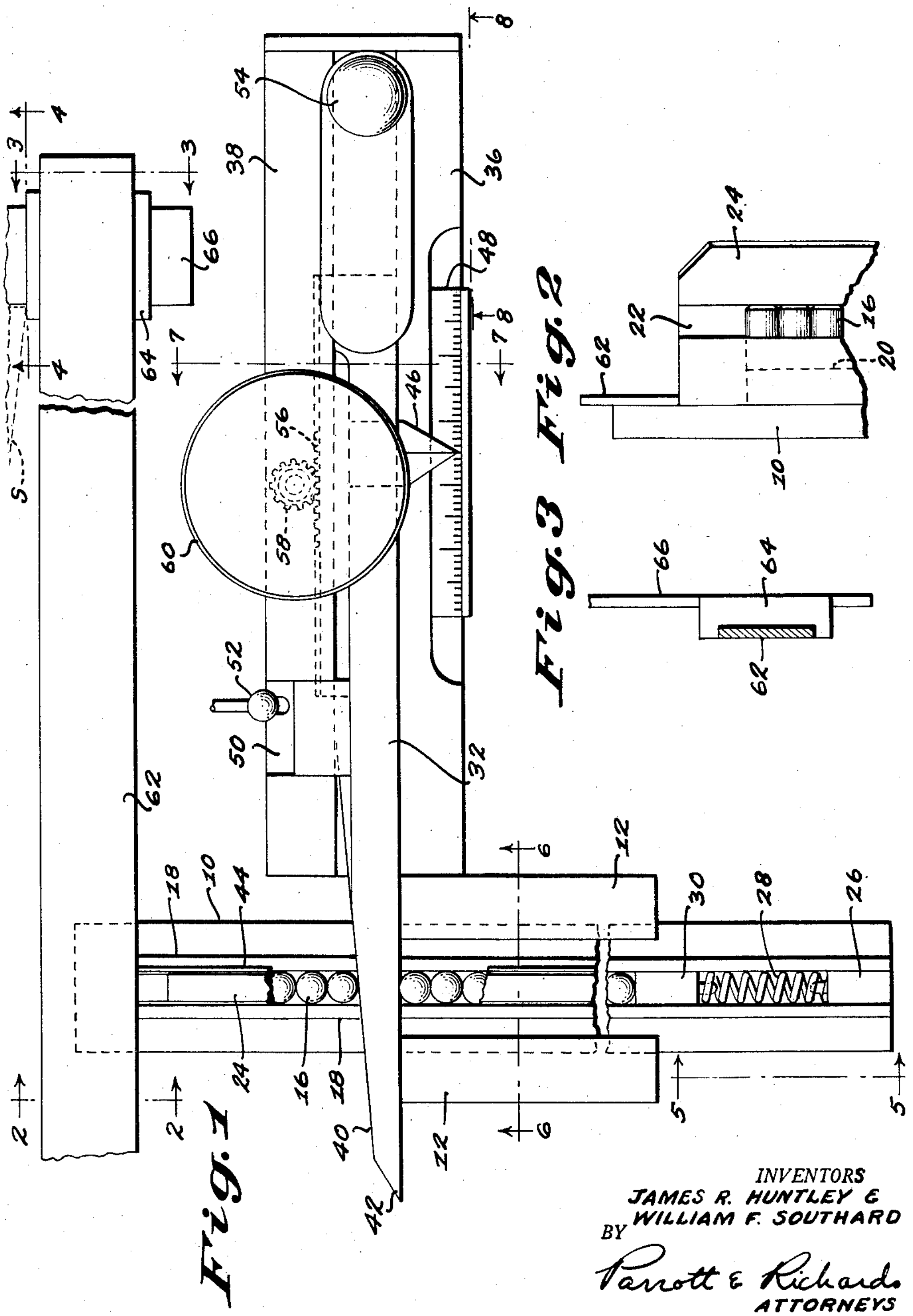
Fig. 1 is a plan view, in part fragmentary, of a measuring gauge structure embodying the present invention.
Fig. 2 is a sectional detail taken substantially at the line 2—2 in Fig. 1.
Fig. 3 is a sectional detail taken substantially at the line 3—3 in Fig. 1.
Figure 6:
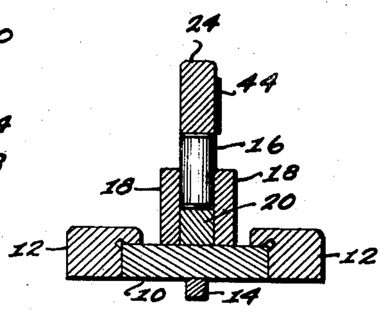
Fig. 6 is a sectional detail taken substantially at the line 6—6 in Fig. 1.
Figure 7:
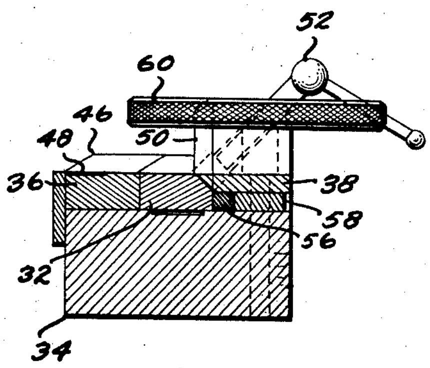
Fig. 7 is a sectional detail taken substantially at the line 7—7 in Fig. 1.
Figure 8:
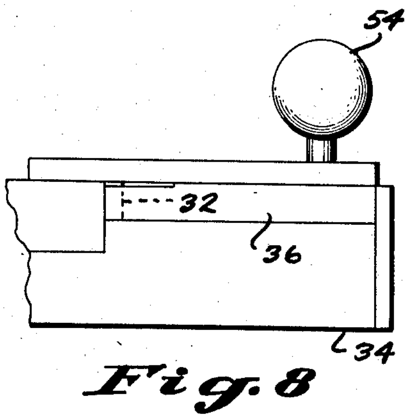
Fig. 8 is a fragmentary side elevation detail at the position indicated by the line 8—8 in Fig. 1.

Referring now in detail to the drawings, and more particularly at first to Fig. 1, the reference numeral 10 indicates a gauging slide member that is slidably positioned by guide blocks 12 fixed to form a guideway on any suitable working surface or the like (not shown). The gauging slide member 10 is also preferably provided at its bottom face with a longitudinal alignment rib 14, as seen in Fig. 6, to fit a corresponding groove in the above mentioned working surface.

The top face of the gauging slide member 10 is arranged to carry a series of unit length gauge blocks 16 longitudinally thereof, and to maintain these gauge blocks 16 yieldably aligned in cumulative measuring relation from one end of the series and displaceable in the direction of the other series end. For this purpose, a pair of side bars 18 are mounted on slide member 10 at opposite sides of a bottom spacer bar 20 to form a retaining channel for the gauge blocks 12 (see Fig. 6). The forward end of the retaining channel thus formed (i.e., the upper end in Fig. 1) is closed by a block member 22 fixed between the side bars 18 and extending upwardly therefrom in a height coextensive with that of the guide blocks 12 to carry a hold down bar 24 reaching therefrom to a similarly arranged closure block 26 at the rear ends of the side bars 18.

At the rear closure block 26 a biasing spring 28 is bottomed to extend forwardly within the retaining channel formed by the side bars 18 and bottom spacer bar 20, and beneath the hold down bar 24, for biasing a slidable pressure block 30 in backing relation to the series of gauge blocks 16 so as to maintain them yieldably positioned for cumulative measurement from the forward end of the series while allowing rearward displacement thereof as noted above.

The unit length gauge blocks 16 carried on the gauging slide member 10 in the above described manner are preferably of cylindrical form with the unit gauge block length at the diameter thereof, and with the cylindrical length thereof proporttioned so that the gauge blocks 16 stand in series on the bottom spacer bar 20 beneath the hold down bar 24 with about half their length exposed sidewise above the side retaining bars 18 for intersection by a cam slide member 32 arranged transversely with respect thereto.

The cam slide member 32 is carried on a support block 34 fixed on the same working surface as the previously mentioned guide blocks 12 for the gauging slide member 10, the support block 34 being fixed in right angular relation to the guide block 12 and forming a second guideway carrying the cam slide member 32 at the proper level for intersecting the series of gauge blocks 16 at the sidewise exposed extent thereof. A slideway is formed at the top face of support block 34 by guide bars 36 and 38 between which the cam slide member 32 is aligned with its longitudinal axis perpendicular to that of the series of gauge blocks 16.

At the side of the cam slide member 32 facing toward the forward end of the series of gauge blocks 16, an inclined cam surface 40 is formed that rises laterally thereof in an extent not less than the unit length of the gauge blocks 16 over an extent lengthwise of cam slide member 32 that corresponds to a substantial multiple of the unit gauge block length. For example, a convenient unit gauge block length for practical coordinate gauging purposes in sheet metal work and the like has been found to be one-half inch, in which case the cam surface 40 has been formed advantageously according to the present invention so as to rise one-half inch over a five inch extent lengthwise and thereby provide a 10:1 cam ratio.

The cam surface 40 provided in this manner is formed from an extending pointed end portion 42 on the cam slide member 32 adapting it for intersecting insertion readily at any point in the series of gauge blocks so as to bring the cam surface 40 to bear on any desired forwardly intersected cumulative length of gauge blocks 16 for adding thereto any fractional part of the unit gauge block length desired and thereby establishing a given gauging measurement.

The gauge block hold down bar 24 may be fitted with a suitable reference scale, as indicated at 44 in Figs. 1 and 6, to facilitate the selection of the proper cumulative length of gauge blocks 16 to be intercepted, and the cam slide member 32 carries a pointer element 46 thereon for setting in relation to a scale 48 inset at the top face of guide bar 36 by which the intersecting position of cam slide member 32 may be measured; the scale 48 being magnified substantially by the above noted 10:1 ratio of cam surface 40 so that highly accurate settings are readily made thereat.

In order to fix the cam slide member 32 at a given setting, the guide bar 38 has a nut block 50 fixed thereon to carry a clamping screw 52 with an angular disposition for seating at a bevel along the adjacent top side edge of cam slide member 32. For setting adjustment, the cam slide member 32 is fitted with a manipulating knob 54 adjacent its rear end, and carries a rack 56 thereon to ride within a groove in the guide bar 38 for engagement thereat by a pinion 58 arranged in the guide bar 38 for operation from a handwheel 60 to provide for fine setting adjustment.

Figure 4:
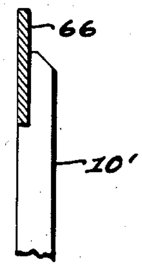
Fig. 4 is a sectional detail from the position indicated by the line 4—4 in Fig. 1, and further indicating the manner in which the measuring gauge structure of the present invention may be arranged in coordinate relation.
Figure 5:
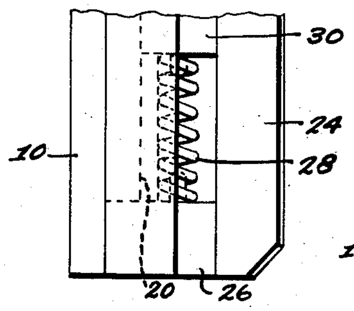
Fig. 5 is a fragmentary side elevation detail at the position indicated by the line 5—5 in Fig. 1.

As thus arranged, the measuring gauge structure of the present invention may be employed with any suitable gauging reference means fitted adjacent the forward end of the gauging slide member 10. Advantageous form of reference means comprises an elongated gauging bar as indicated at 62 in Fig. 1, which may be arranged to extend right angularly from gauging slide member 10 so as to ride and be slidably engaged at a slotted top face of a crosshead member 64 having the bottom face thereof right angularly slotted for similarly engaging a second elongated gauging bar 66 that may be right angularly fitted on a second like gauging slide member (as indicated at 10' in Fig. 4) carrying a like series of unit length gauge blocks (not shown) and having a like cam slide member (not shown) arranged in transverse relation thereto so as to complete a coordinate gauging system in which the crosshead member 64 may be employed for gauging reference (as indicated by fragmentary dotted lines at S in Fig. 1) whenever it is necessary to eliminate error through lack of squareness in sheet material or the like on which coordinate gauging measurements are to be made.

The present invention has been described in detail above for purposes of illustration only and is not intended to be limited by this description or otherwise except as defined in the appended claims.

We claim:

1. A measuring gauge structure comprising a first guideway, a gauging slide member positioned in said first guideway, a series of unit length gauge blocks carried by said gauging slide member, a second guideway, means fixing said second guideway transversely of said first guideway, a cam slide member positioned in said second guideway transversely with respect to said gauging slide member for selectively intersecting said gauge block series, said cam slide member being formed with an inclined cam surface rising laterally thereof in an extent not less than the unit length of said gauge blocks over an extent lengthwise of said cam slide member corresponding to a substantial multiple of said unit length, and means fixed in relation to said second guideway parallel to the guided axis of said cam slide member therein and related to said cam surface for indicating the intersecting position of said cam slide member.

2. A measuring gauge structure comprising a first guideway, a gauging slide member positioned in said first guideway and fitted with gauging reference means adjacent one end thereof, a series of unit length gauge blocks carried by said gauging slide member longitudinally thereof and yieldably positioned in cumulative measuring relation with respect to said reference means, a second guideway, means fixing said second guideway transversely of said first guideway, a cam slide member positioned in said second guideway transversely with respect to said gauging slide member for selectively intersecting said gauge block series, said cam slide member being formed with an inclined cam surface at the side thereof facing toward the end of said gauging slide member at which said reference means is fitted, said cam surface rising laterally of said cam slide member in an extent not less than the unit length of said gauge blocks over an extent lengthwise of said cam slide member corresponding to a substantial multiple of said unit length, and means fixed in relation to said second guideway parallel to the guided axis of said cam slide member therein and related to said cam surface for measuring the intersecting extent of said cam slide member.

3. A measuring gauge structure as defined in claim 2 and further characterized in that said gauging reference means comprises an elongated positioning bar extending in right angular relation to the longitudinal axis of said gauging slide member.

4. A measuring gauge structure as defined in claim 3 and further characterized in that said structure additionally comprises a crosshead member having opposite faces thereof respectively slotted in right angular relation with respect to each other, said first mentioned elongated positioning bar being slidably engaged at one slotted face of said crosshead member, and a second elongated positioning bar slidably engaged at the other slotted face of said crosshead member.

5. A measuring gauge structure as defined in claim 4 and further characterized in that said structure additionally comprises a like gauging slide member fitted in right angular relation on said second elongated positioning bar, said like gauging slide member being positioned in a like first guideway and carrying a like series of unit gauge blocks, a like second guideway arranged laterally with respect to said like first guideway, and a like cam slide member positioned in said second guideway in corresponding transverse relation to said like gauging slide member.

6. A measuring gauge structure comprising a first guideway, a series of unit length gauge blocks, said gauge blocks being cylindrical in form with the unit gauge block length at the diameter thereof, means yieldably maintaining said gauge blocks serially aligned and slidably positioned lengthwise in said first guideway in cumulative measuring relation from one end thereof and displaceable in the direction of the other end thereof, a second guideway, means fixing said second guideway transversely of said first guideway, a cam slide member positioned in said second guideway arranged for selectively intersecting said gauge block series, the longitudinal axis of said cam slide member being perpendicular to the serial alignment of said gauge blocks and the side thereof facing toward the first mentioned end of said guage block series being formed with an inclined cam surface rising laterally of said cam slide member in an extent not less than the unit length of said gauge blocks over an extent lengthwise of said cam slide member corresponding to a substantial multiple of said unit length, and means fixed in relation to said second guideway parallel to the guided axis of said cam slide member therein and related to said cam surface for indicating the intersecting position of said cam slide member.

7. A measuring gauge structure as defined in claim 6 and further characterized in that the cam surface on said cam slide member is inclined to rise in an extent equal to said unit gauge block length over a lengthwise extent of the order of ten times said unit length.

References Cited in the file of this patent

UNITED STATES PATENTS

| | | |
|---|---|---|
| 1,526,305 | Neumaier | Feb. 10, 1925 |
| 2,144,972 | Hirst | Jan. 24, 1939 |
| 2,421,440 | Thorpe | June 3, 1947 |

FOREIGN PATENTS

| | | |
|---|---|---|
| 197,046 | Germany | Apr. 6, 1908 |
| 289,223 | Germany | Dec. 11, 1915 |
| 532,163 | Great Britain | Jan. 17, 1941 |
| 283,095 | Switzerland | Feb. 16, 1953 |